F. F. ZUCKSCHWERDT.
THERMOMETER.
APPLICATION FILED SEPT. 14, 1911.
1,101,003.
Patented June 23, 1914.
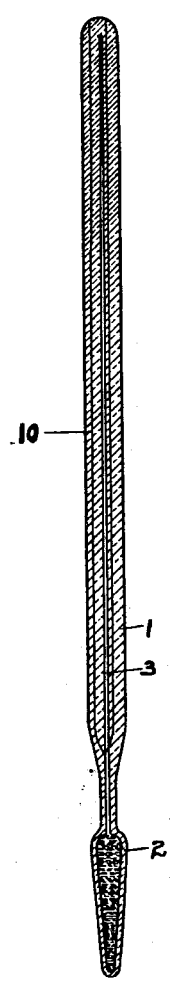
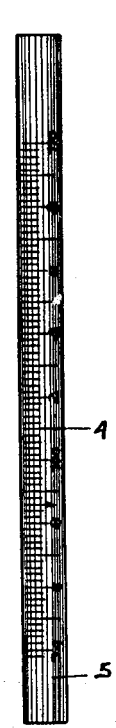
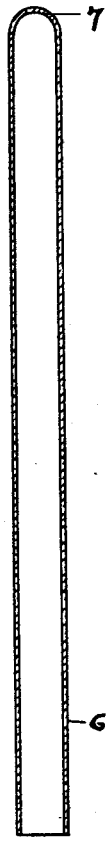
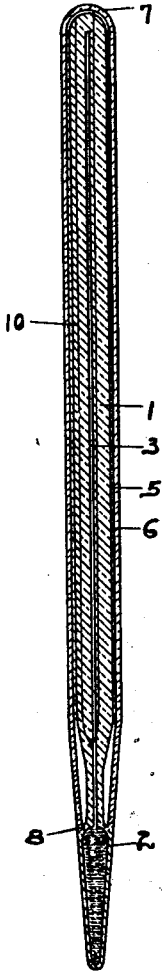
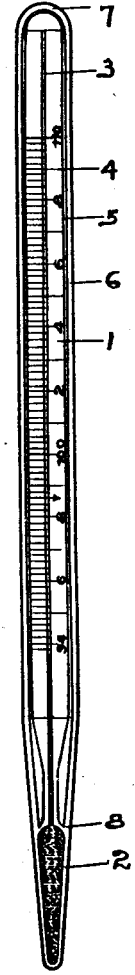
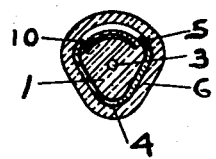
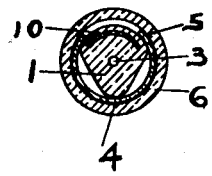
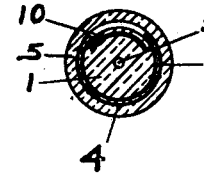
Inventor
Fritz F. Zuckschwerdt
By Percy Norton
Attorney
Witnesses
Grover Ilgen
Virgil Baker

UNITED STATES PATENT OFFICE.

FRITZ F. ZUCKSCHWERDT, OF ILMENAU, GERMANY, ASSIGNOR TO LINUS B. KAUFFMAN, OF COLUMBUS, OHIO.

THERMOMETER.

1,101,003.  Specification of Letters Patent.  Patented June 23, 1914.

Application filed September 14, 1911. Serial No. 649,230.

*To all whom it may concern:*

Be it known that I, FRITZ F. ZUCKSCHWERDT, a subject of the Emperor of Germany, residing at Ilmenau, Thuringia, Germany, have invented certain new and useful Improvements in Thermometers, of which the following is a specification, reference being had therein to the accompanying drawings.

My invention relates to thermometers.

The object of my invention is to strengthen and protect the thermometer tube and scale and to make the same antiseptic and sanitary. This I accomplish by employing a cover or casing to seal the scale from contact with foreign matter.

A further object is to provide an improved scale. The scale may be etched upon the surface of the tube and coated or filled with a coloring matter to more clearly define the same; but I have devised and preferally employ a scale printed upon a sheet of transparent material such as gelatin. It may be printed in any color but I preferably employ black; and I preferably form a strip of enamel preferably white, on the opposite side of the tube or casing to the scale to form a back-ground for same so that it may be more easily read.

With these and other objects in view my invention consists of the constructions and combinations hereinafter described and set forth in the claims.

In the accompanying drawings Figure 1 represents a thermometer embodying my invention. Fig. 2 is a longitudinal section of same. Fig. 3 represents a casing fused or welded together at one end ready to slip over the thermometer tube and be welded at its other end to the tube. Fig. 4 represents a strip of transparent material having a scale thereon. Fig. 5 is a longitudinal section of the tube without the scale and casing and Figs. 6, 7 and 8 represent different forms of the tube and casing in cross-section, Figs. 6 and 7 showing the tube angular or lens-shaped with the casing conforming to same in Fig. 6 and cylindrical in Fig. 7 and Fig. 8 shows the tube round with the casing cylindrical to conform to same.

Like numerals represent the same parts in the several views.

In the drawings 1 represents a thermometer tube having a bulb 2 and bore 3 for the expanding substance. A scale may be etched upon the outer surface of the tube and filled or coated with a coloring matter; but I preferably print the scale 4 upon a separate sheet of transparent substance 5 such as gelatin and secure the same to the tube. This may be done in any suitable way as by a cover of the necessary dimensions; but I preferably provide a casing 6, the interior of which I preferably conform to the exterior of the tube although it may be of any suitable form. I preferably employ gelatin or like substance for the scale sheet, as it is not only transparent but can be readily bent to its position between the tube and casing; and I preferably make the tube and casing of glass as that material is fusible and can be easily welded.

The casing may be of sufficient length to entirely inclose the tube and the ends of the casing fused or welded to hold the tube within the casing; but I preferably employ a casing closed at one end 7 and fused or welded to the tube at the other end 8 as shown. This fusing or welding of the cover or casing seals the scale from contact with foreign matter, avoids the possibility of disease germs finding lodgment in the scale to be carried from one person to another when the thermometer is used to take the temperature of the body; and further prevents the destruction of the scale by coming in contact with chemicals or other disintegrating matter. I preferably provide a strip of enamel as a back-ground to more clearly define the scale and I have shown the same at 10 as being formed in the tube. Further I preferably form the tube angular or lens-shaped in cross-section as particularly shown in Figs. 6 and 7 so that the scale can be more easily read; and I preferably form the interior of the casing to conform to the tube; but the casing may be of any suitable shape, it being shown cylindrical in Figs. 7 and 8; and in Fig. 8 the tube is shown round to conform with the cylinder.

Having thus described my invention I claim:

1. In a thermometer, a tube having a bore for the expanding substance, a cover or casing, and a sheet of flexible transparent material having a scale interposed between said tube and cover or casing, said cover or casing being sealed or welded to said tube, substantially as described.

2. In a thermometer, a tube having a bore for the expanding substance, a cover or casing, a sheet of flexible transparent material having a scale thereon interposed between said tube and cover or casing and a strip of enamel opposite said scale, said cover or casing being sealed to protect said scale, substantially as described.

3. In a thermometer, a glass tube having a bulb and bore for the expanding material, a glass cover or casing for said tube, a sheet of gelatin having a scale thereon interposed between said tube and cover or casing, said sheet being flexible to bend and conform to the shape of said tube and said cover or casing being sealed at its respective ends, substantially as described.

4. In a thermometer, a glass tube having a bulb and bore for the expanding substance, a glass cover or casing, a sheet of gelatin having a scale printed thereon and interposed between said tube and cover or casing, an enamel strip opposite said scale, said sheet being flexible to conform to its position between said tube and cover or casing and said cover or casing being fused or welded at its respective ends, substantially as described.

In testimony whereof I have hereunto affixed my signature in the presence of two witnesses.

FRITZ F. ZUCKSCHWERDT.

Witnesses:
CARL N. LOREY,
Dr. ADAM STOTT.